(12) United States Patent
Jacobs

(10) Patent No.: US 6,196,326 B1
(45) Date of Patent: *Mar. 6, 2001

(54) COMPOSITION FOR PROTECTING A HORSE'S HOOF AND METHOD

(76) Inventor: Richard L. Jacobs, 1630 Fiske Pl., Thousand Oaks, CA (US) 93030

( * ) Notice: Subject to any disclaimer, the term of this patent is extended or adjusted under 35 U.S.C. 154(b) by 0 days.

This patent is subject to a terminal disclaimer.

(21) Appl. No.: 09/499,005

(22) Filed: Feb. 4, 2000

Related U.S. Application Data

(63) Continuation of application No. 09/143,597, filed on Aug. 31, 1998, now Pat. No. 6,021,851.

(51) Int. Cl.⁷ .................................................... A01L 15/00
(52) U.S. Cl. ........................................ 168/4; 168/DIG. 1
(58) Field of Search .................................. 168/4, DIG. 1; 606/212; 423/364

(56) References Cited

U.S. PATENT DOCUMENTS

| | | | | |
|---|---|---|---|---|
| 4,896,727 | * | 1/1990 | Busser | 168/4 |
| 4,917,192 | * | 4/1990 | Monticello | 168/4 |
| 5,681,350 | * | 10/1997 | Stovall | 168/DIG. 1 X |
| 6,021,851 | * | 2/2000 | Jacobs | 168/4 |

* cited by examiner

*Primary Examiner*—Robert P. Swiatek
(74) *Attorney, Agent, or Firm*—Louis J. Bachand

(57) ABSTRACT

Horse hoof protection is obtained by incorporating a urethane resin reaction product of low viscosity sides A and B which react rapidly to gel in a few seconds while filling the interstices of the horse's hoof and have when reacted a low hardness of 40 to 80 Shore A to cushion the hoof.

7 Claims, 2 Drawing Sheets

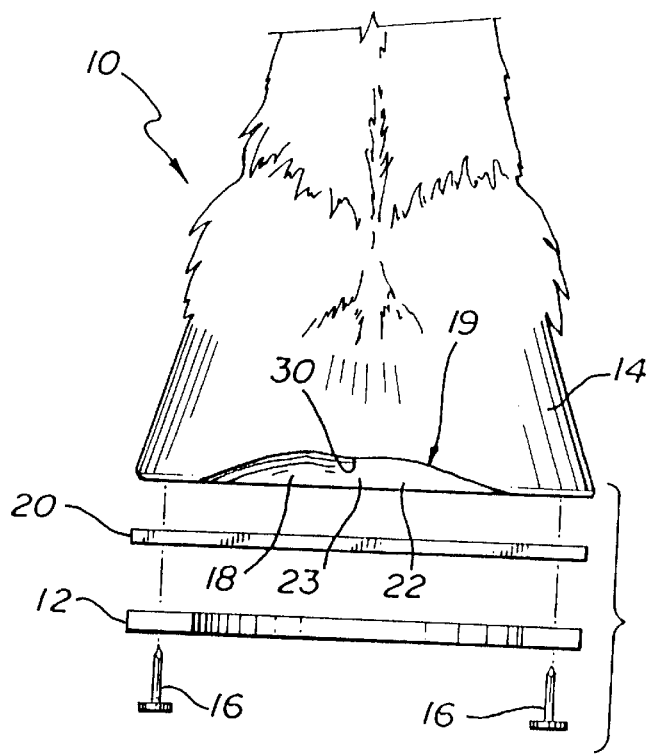
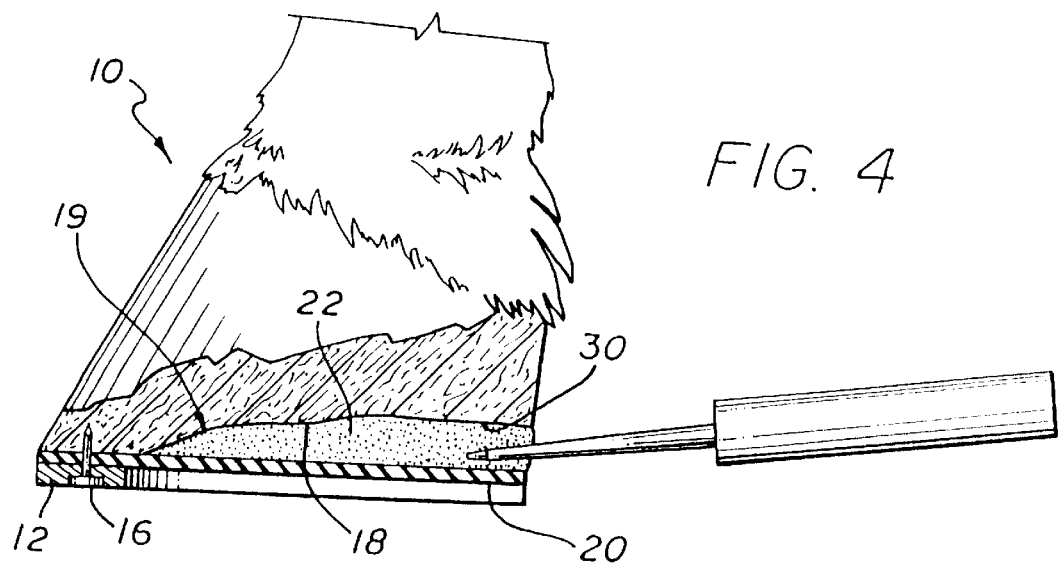

COMPOSITION FOR PROTECTING A HORSE'S HOOF AND METHOD

CROSS REFERENCES TO RELATED APPLICATIONS

This application is a Continuation of U.S. patent application Ser. No. 09/143,597, filed Aug. 31, 1998, now U.S. Pat. No. 6,021,851, issued Feb. 8, 2000.

BACKGROUND OF THE INVENTION

1. Technical Field

This invention relates to horse hoof protection, and more particularly to a new urethane resin composition and methods for the cushioning of the horse's hoof and the blocking of ingress of harmful debris into the sensitive frog portion of the hoof.

2. Related Art

Webs of leather, plastic or rubber, called pads, attached to the hoof wall, and sized to extend across the hoof sole and cover the frog portion of the hoof are sometimes inserted under the horseshoe to protect the sensitive areas of the hoof. Moisture or debris sometimes work their way into the open volume defined broadly by the hoof bottom wall comprising the hoof sole and frog, causing discomfort or harm to the animal. Efforts to fill the volume have involved adding resins to the sole and covering with the web. These expedients have not proved successful because of difficulties in handling the resins, available resins having too high viscosity to permit readily filling into the horse hoof volume, persistent resin tackiness, lack of fill of all interstices or voids within the volume, and undue final hardness of the resin. Further, known resins do not adhere to the web used to cover the hook flog, leaving space between the resin mass and the web or pad for incursions of debris.

SUMMARY OF THE INVENTION

It is all object of the invention to provide protection for horses' hoofs, and cushioning for horses' steps. It is a further object to provide a hoof packing composition and method, the composition being a urethane resin that that flows easily and readily into the hoof volume and the interstices thereof, e.g. from a dual chamber dispenser easily operated with one hand. The new composition gels and sets up nearly immediately to a firm, somewhat resilient mass with a hardness between about 40 and 80 Shore A. The invention composition adheres to the hoof volume walls against loss of the mass or incursions of debris. The invention avoids the difficulties of resin tackiness, incursions of debris from loose or incomplete fill, undue hardness in the resin, and handling problems arising from use of putty-like or heavier resins which must be packed in rather than flowed in. It is a further object of the invention to provide a method of injecting the invention resin composition into the volume defined by the hoof bottom wall, e.g. under a protecting web on a horse hoof or without such web, in which the interstices and surface voids of the volume are completely filled so that there is no incursion of debris, no handling problems with pasty or tacky resin systems, and the final result is a softer and more resilient mass than the horse hoof wall, the mass even being transparent to permit viewing of the horse's sole. Further it is an object to adhere the web or pad to the resin mass, making the hoof protection unitary and completely blocked against debris intrusion.

These and other objects of the invention to become apparent hereinafter are realized in the method of protecting a horse's hoof, including cleaning the open volume formed by the hoof bottom wall of debris, incorporating a rapidly gelling synthetic organic resin into the volume, the resin having a viscosity Such that the resin freely conforms to the contours of the hoof bottom wall, and gelling the resin in situ in hoof bottom wall adhering relation, the resin comprising the urethane reaction product of

| | Parts |
|---|---|
| Composition-Side A | |
| Methylene-bis-dicyclohexane diisocyanate | 134 |
| Polyoxy propylene oxide ether polyol, triol (6000 MW) | 192 |
| D.B. castor oil | 28 |
| Methylene-bis-diphenyl diisocyanate | 72 |
| 3-(triethoxysilyl)propyl isocyanate | 24 |
| Composition-Side B | |
| Methylene-bis-dicyclohexane diisocyanate | 196 |
| Polyoxy propylene oxide ether polyol, diol (2000 MW) | 83 |
| Polyoxy propylene oxide ether polyol, triol (450 MW) | 96 |
| Ethylene diamine tetra propoxylate | 38 |
| Butanediol, 1, 4 | 17 |
| Bismuth naphthenate | 21 |

In this and like embodiments, typically, the method further includes injecting the resin into the volume against the hoof bottom wall in conforming relation therewith; and, where the volume has an open mouth, including also fixing a web across the volume open mouth, and thereafter incorporating the synthetic resin into the volume under the web, and gelling; and, selecting as the synthetic resin a urethane resin having a gel time of about 20 seconds, the gelled resin adhering to the hoof bottom wall, and, fixing the web in place with nails, fasteners, adhesive, or otherwise into the hoof bottom wall; fixing the web to the hoof with a horseshoe secured to the hoof bottom wall; and gelling the resin to a hardness of between about 40 and 80 Shore A.

Typically, the invention resin when finally gelled is softer than the horny wall of the hoof and cushions the hoof against shock; and, may be transparent or at least translucent when gelled, so that the hoof sole is visible through the resin.

Typically, the Resin Sides A and B are combined from a pair of cartridges into a static mixer separate reactive resin components forming a rapidly curing synthetic organic resin in an amount suitable for hydraulically filling the volume, conforming the resin to the contours of the hoof bottom wall, and curing the resin to a gel in situ.

In a further embodiment, the invention provides a protected horse hoof comprising a hoof and a hoof bottom wall forming an open volume and a synthetic organic resin conformed with and adhered to the hoof bottom wall in volume filling relation such that the hoof volume is free of unfilled voids and interstices, the resin comprising the urethane resin described above.

In this and like embodiments, typically, the synthetic organic resin within the volume is covered by a web fixed to the hoof; the cured synthetic organic resin has a Shore A hardness between about 40 and 80 and is softer than the horny wall of the hoof and cushions the hoof against shock.

In yet another embodiment, the invention provides the method of protecting a horse from injury during walking or running, including filling the open volume defined by the horse hoof wall with a synthetic organic resin having a viscosity to flow through the interstices of the hoof bottom wall, said resin gelling to be softer than and adherent to the horse hoof wall, and gelling the resin in situ, the resin comprising the urethane resection product described above.

The invention thus provides the urethane reaction product of

|  | Parts |
| --- | --- |
| Composition-Side A | |
| Methylene-bis-dicyclohexane diisocyanate | 134 |
| Polyoxy propylene oxide ether polyol, triol (6000 MW) | 192 |
| D.B. castor oil | 28 |
| Methylene-bis-diphenyl diisocyanate | 72 |
| 3-(triethoxysilyl)propyl isocyanate | 24 |
| Composition-Side B | |
| Methylene-bis-dicyclohexane diisocyanate | 196 |
| Polyoxy propylene oxide ether polyol, diol (2000 MW) | 83 |
| Polyoxy propylene oxide ether polyol, triol (450 MW) | 96 |
| Ethylene diamine tetra propoxylate | 38 |
| Butanediol, 1, 4 | 17 |
| Bismuth naphthenate | 21 |

The invention also provides the foregoing composition in a dispensing package for incorporating gelling synthetic organic resin into a horse hoof comprising a dual cartridge dispenser in which Side A and Side B of the urethane resin reaction product set forth is packaged each in one of the dual chambers.

BRIEF DESCRIPTION OF THE DRAWINGS

The invention will be further described in conjunction with the attached drawings in which:

FIG. 3 is a view like FIG. 2, exploded;

FIG. 4 is a view taken on line 4—4 in FIG. 2 and depicts the dual cartridge dispenser in which the resin sides A and B are packaged and from which the sides are injected into the hoof volume by hand.

DETAILED DESCRIPTION

Horse hoofs are conventionally shod by nailing a horseshoe to the horny wall forming the outer portion of the hoof. Within the horny wall are the sole of the hoof and the sensitive frog portion of the hoof, generally referred to herein jointly as the hoof bottom wall. These portions of the hoof are not protected from damage from contact with moisture or other forms of debris and harmful objects. It is a common practice to add a web across the hoof sole, usually supported by the horseshoe or horseshoe nails to protect the sole ol the hoof. Debris can enter the open volume defined by the hoof bottom wall, even under the web unless the volume is filled with a suitable material. Suitable materials will fill all spaces in the volume ands prevent voids and interstices from occurring. In the past, foam resins have been employed, but they do not hold up against the stresses imposed in use and allow incursions of debris, moisture and contamination. Other materials are stiff and difficult to work with and like the foam systems do not adhere to the hoof bottom wall and thus allow, especially after wearing for a time, the incursion of debris which is uncomfortable and even harmful to the horse. The present invention uses a gelled resin to fill the open volume, suitably adherent to the hoof bottom wall against incursive attacks from debris and moisture even after a time of use. The preferred resins herein are injectable using dual cartridge dispensers which direct reactive components of low viscosity through a static mixer into the hoof volume where their initially low viscosity enables flow throughout the volume and into the nooks, crannies, interstices and voids of the volume and occurring on the hoof walls. The resin then sets up and adheres to the walls, more resilient than the surrounding hoof to cushion the steps of the horse while protecting from debris incursions.

Figure 1:
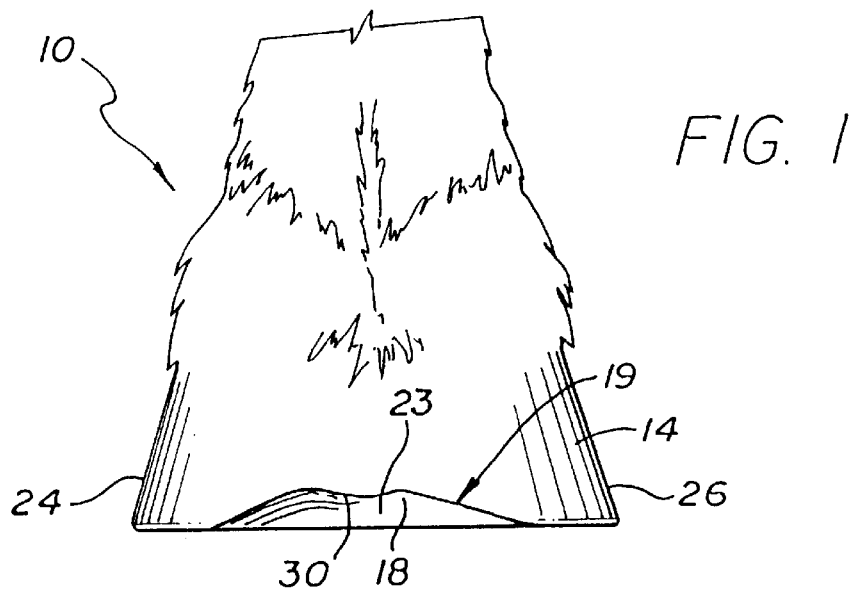
FIG. 1 is a view in elevation of an unshod horse hoof.
Figure 2:
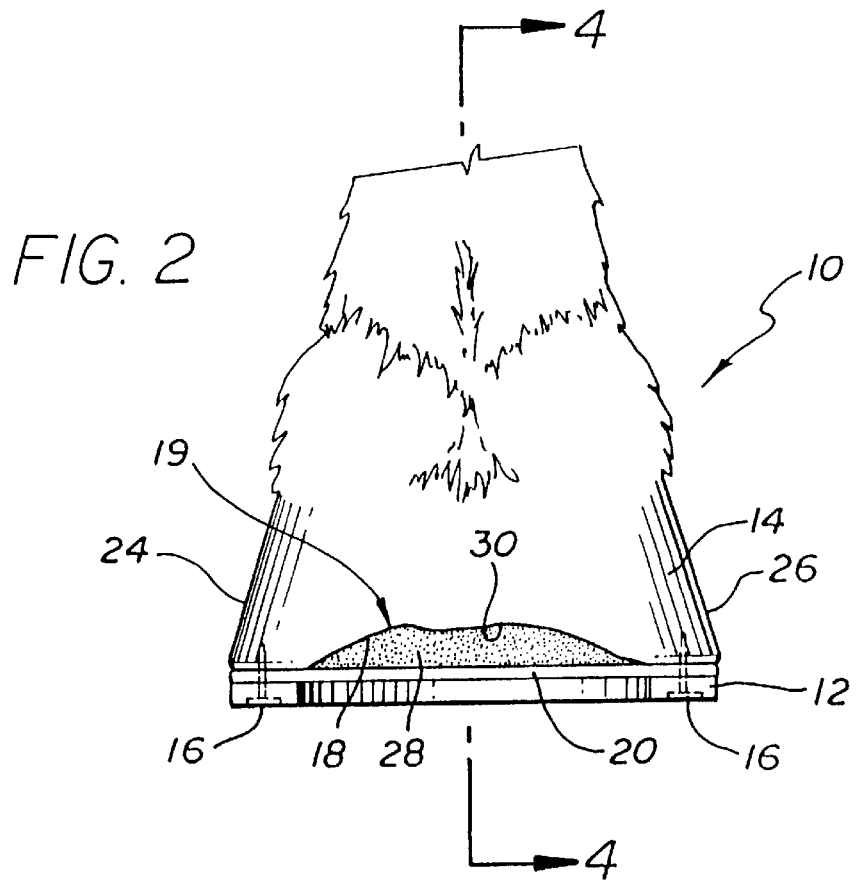
FIG. 2 is a view of the horse hoof after addition of a horseshoe, the web and the resin mass according to the invention.

With reference to FIGS. 1–4, the hoof 10 is shod with a shoe 12 fixed to the hoof wall 14 by nails 16. An optional leather, synthetic organic resin plastic, or rubber material web 20 is stretched across the hoof sole portion 18, and anchored there by the nails 16 and horseshoe 12. The web 20 can be also affixed by any other suitable means such as adhesive, clamps, and the like. The use of the web is not necessary with the present resin masses owing to their rapid increase in viscosity within the hoof volume 22 and their final adhesion to the hoof bottom wall 19 sole and frog portions, 18, 30.

The hoof open volume 22 is defined by the hoof bottom wall 19, comprising the hoof sole portion 18 and the hoof frog portion 30, has a mouth 23 which is closed by the web 20 extending laterally between the left and right portions 24, 26 of the hoof horny wall 14. As noted, the use of the web 20 is not necessary in this invention. The volume 22 is filled with an injectable, e.g. liquid resin, forming a mass 28. Because of rapid gelling of the resin, e.g. in from less than 25 seconds to less than about 2 minutes, and preferably within 20 seconds, with and 8–12 second working time, there is no need to support the resin in place until gelation as with a web 20, particularly with the faster gelling resins, The terms hydraulically filled and hydraulically full herein refer to the filling with the liquid resin mass 28 of substantially all the voids, crevices and interstices of the hoof sole portion 18 including areas surrounding and covering the frog portion 30 of the hoof, and to filling the volume 22 from the hoof sole 18 to the web 20 so that incursions of debris including moisture into the volume 22 are blocked.

The resin used to form the mass 28 is desirably a highly fluid liquid which can be and preferably is injected into the volume 22 to spread throughout the volume, to contact all surfaces therein, and to adhere to such surfaces in a void eliminating manner. The resin mass 28 can be comprised of solid (void-free) or cellular, foamed, resin as desired. Solid, foam free resin reactants free of foam-formers will be free of voids and pockets of air or gas when cured, unlike foam systems that deliberately create voids. The resin mass 28 gels in place, i.e. in situ. Viscosities of the fluid form of the mass 28 are selected such that the incorporation of the mass into the volume 22 is quickly accomplished, in a matter of less than 5 to 20 seconds typically and usually less than a few minutes. Incorporation by injection rather than by hand packing as has been common with nonfluid volume fillers enables rapid distribution of the resin mass 28 through the volume 22 and the infilling of voids and interstices of the hoof bottom wall surfaces. Viscosities of less than about 25,000 and preferably less than 2500 centipoises may be used, with viscosities as low as that of water being useful. The invention resin described herein is highly advantageous in being reactable in a 1:1 ratio, having very low viscosities which is an advantage in delivery of the components from an injection device such as a dual cartridge dispenser as shown in U.S. Pat. No. 4,969,400 or other devices, including preferably simple hand-held dispensers in which the user's thumb advances the pistons down dual chambers to extrude the resin Sides A and B together. The invention resin is rapid gelling to cure to a substantial viscosity, e.g. 100,000 centipoises almost immediately while still being fluid enough initially to fill the interstices of the hoof walls. For many of these properties the resin is comprised of a very high amount of catalyst relative to conventional urethane resin systems. A rapidly high viscosity gives the resin mass 28 the ability to not flow from the volume 22. This increased viscosity preferably happens in 10 to 20 seconds or less than 25 seconds, but other times, up to 2 minutes or more where conditions permit, and where the foregoing handling criterion is met can be used. Resin compositions are usefully packaged in dual cartridge packages from which they may be discharged through a static mixer tip to combine into a reactive mixture which is injectable into the volume 22. For rapid cure to a sufficiently gelled state, while maintaining low viscosity during delivery, and obtaining a soft gel finally, the amount of catalyst should be selected in concert with these properties and the desired gel time, e.g. 3 to 7% and preferably about 5% by weight of a urethane reaction catalyst, such as bismuth naphthenate, for a 20 second cure to the adequately gelled state, with final gelation or cure occurring over the next day or so.

While the preferred urethane resins herein may be initially tacky, this tackiness is lost upon fully curing. The preferred application method of incorporation by injection mentioned above makes tackiness or not unimportant since tile resins can be injected directly under the previously applied web, if used, and no hand or spatula contact is required, even where the web is not used.

A further feature of the invention is the cure of the resin to a relatively soft and resilient state, e.g. to a hardness less and a softness greater than that of the horny portion of the hoof. Resilience of the resin is its capacity to deform and return to its undeformed condition substantially immediately and to persist in this resilient quality over substantially the life of the resin in the hoof volume 22. Typically, this resilience is achieved by selecting reactants and reaction conditions known in the art to limit the degree of final cure to such that the resin mass 28 has resiliency to a degree that under the compression of the horse's weight it will yield slightly under the web, cushioning the horse's step and promptly and persistently recovering its original dimensions. A hardness value of 40 to 80 Shore A for a fully gelled, void-free resin is preferred.

The useful filler resin mass system herein comprises the urethane resin set forth in the following Example. The term curing includes gelation and vice versa, and each term herein refers to polymerization, whether of the thermosetting or thermoplastic type, between resin components, or other processes by which a resin or resins change from a liquid to a solid state, including by loss of a diluent or solvent.

EXAMPLE

A fast-gelling, low hardness gel was prepared from a reactive urethane resin mixture comprising two parts of equal volume for dispensing from a dual cartridge dispenser in which dual pistons on a common yoke extrude the separate reactive components through a manifold and into a mix tip comprising a series of baffles arranged to cut and recombine the mixing materials as they progress through the mix tip.

Part A of the mixture comprised (all parts and percentages are by weight):

|  | Parts |
|---|---|
| Composition-Side A | |
| Methylene-bis-dicyclohexane diisocyanate (Desmodur W) | 134 |
| Polyoxy propylene oxide ether polyol, triol (6000 MW) (Multranol 3900) | 192 |
| D.B. (Double Boiled) castor oil | 28 |
| And | |
| Methylene-bis-diphenyl diisocyanate (Isonate 2143L) | 72 |
| And | |
| 3-(triethoxysilyl)propyl isocyanate (Silane Y9030) | 24 |
| Composition-Side B | |
| Multranol 3900 | 196 |
| Polyoxy propylene oxide ether polyol, diol (2000 MW) (Multranol 3600) | 83 |
| Polyoxy propylene oxide ether polyol, triol (450 MW) (Multranol 4012) | 96 |
| Ethylene diamine tetra propoxylate (Quadrol) | 38 |
| Butanediol, 1, 4 | 17 |
| And | |
| Bismuth naphthenate (Coscat 83) | 21 |

The first three Side A components were mixed together in a suitable vessel, then the second and third isocyanate components were mixed in, and the mixture put up in a first chamber of a dual chamber dispenser Viscosity of the Side A composition was in the range of about 1000–2000 centipoises at about 25° C. The Side B components were mixed together without the Coscat catalyst, then the catalyst was added at the indicated high amount (about 5% by weight) and the mixture was put up in the second chamber of the dual chamber dispenser The Side B viscosity was in the range of about 800–2000 centipoises, also at about 25° C. Importantly, the above Side A and Side B compositions are reactive to a urethane polymer when mixed in a 1:1 ratio, making this composition ideal for dispensing from a conventional 1:1 dual chamber cartridge. Other ratios can be used but they are less convenient, and the cartridge dispensers required, e.g. 2:1 are more costly.

A hoof treatment was effected by simultaneously expelling the contents of both chambers of the dual chamber dispenser through a common mix tip where they were intimately mixed under severe shear conditions into the volume defined by the hoof below the hoof pad. Injection took about 5 seconds. The like viscosities and the 1:1 mix ratio of the example composition make their packaging and dispensing to be readily accomplished. The sides react in the mix tip and within the hoof volume. The low viscosity of the mixed components enables the ready and rapid filling of the small interstices in the hoof wall. The mixture, however, after a working time of about 8 to 12 seconds, gels very rapidly, within about 20 seconds, so that the mixture remains disposed within the hoof volume. The farrier can put the hoof down after this brief gelling time, as the composition is adhered to the hoof wall, the web across the void, if used, and will not drop or squeeze out. The composition is solid and free of voids, cellularity and foam structure, but provides the desired cushioning effect noted above. The gelled resin was translucent to clear. Typical hardness values for the fully gelled composition are in the range of Shore A 40 to 80 after 24 hours at room temperature; thus hoof cushioning is achieved without a foamed compositions.

The foregoing objects of providing a hoof packing composition and method that avoid debris incursions, protect the horse hoof by completely filling the voids and interstices therein, and remain resilient and cushioning are thus met.

I claim:

1. The method of protecting a horse's hoof, including cleaning of debris the open volume surrounded by the horny wall forming the outer portion of the hoof and formed by the hoof bottom wall, incorporating a rapidly gelling synthetic organic resin adherent into said volume, said resin having a viscosity such that said resin flows freely to conform to the contours of said hoof bottom wall before curing, and gelling said resin in situ in hoof bottom wall, said resin comprising a urethane resin.

2. The method according to claim 1, said volume having an open mouth, and including also fixing a web across said volume open mouth, and thereafter incorporating said synthetic resin into said volume under said web, and gelling.

3. The method according to claim 1, including also selecting as said synthetic resin a urethane resin having a gel time of about 20 seconds, said gelled resin adhering to said hoof bottom wall.

4. The method according to claim 1, including also fixing a web across said open volume, and incorporating said urethane resin under said web and into said volume in hoof bottom wall conforming relation, and gelling said resin in situ adherent to said hoof bottom wall.

5. The method according to claim 4, including also fixing said web in place with nails into said hoof bottom wall.

6. The method according to claim 1, including also gelling said resin to a hardness of between about 40 and 80 Shore A.

7. The method of protecting a horse from injury during walking or running, including filling the open volume defined and surrounded by the horse hoof wall with a synthetic organic resin having a viscosity to flow through the interstices of the hoof bottom wall, said resin gelling to be softer than and adherent to said horse hoof wall, and gelling said resin in situ, said resin comprising a urethane resin.

* * * * *